Feb. 21, 1939.  T. W. KIRKMAN  2,148,076
MOTION PICTURE CAMERA
Filed Oct. 7, 1936  2 Sheets-Sheet 1
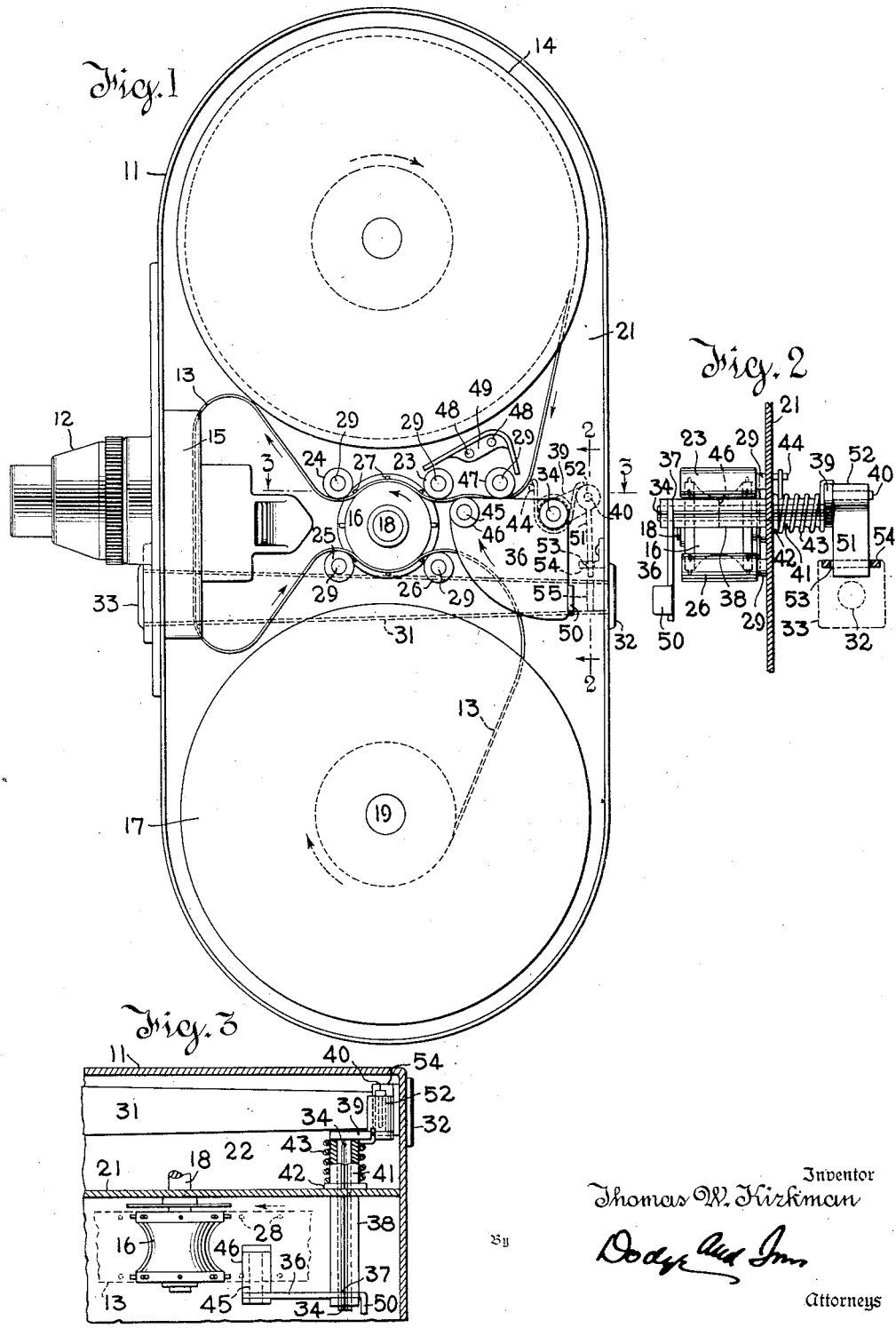
Inventor
Thomas W. Kirkman
By Dodge and Sons
Attorneys Feb. 21, 1939.  T. W. KIRKMAN  2,148,076
MOTION PICTURE CAMERA
Filed Oct. 7, 1936  2 Sheets-Sheet 2
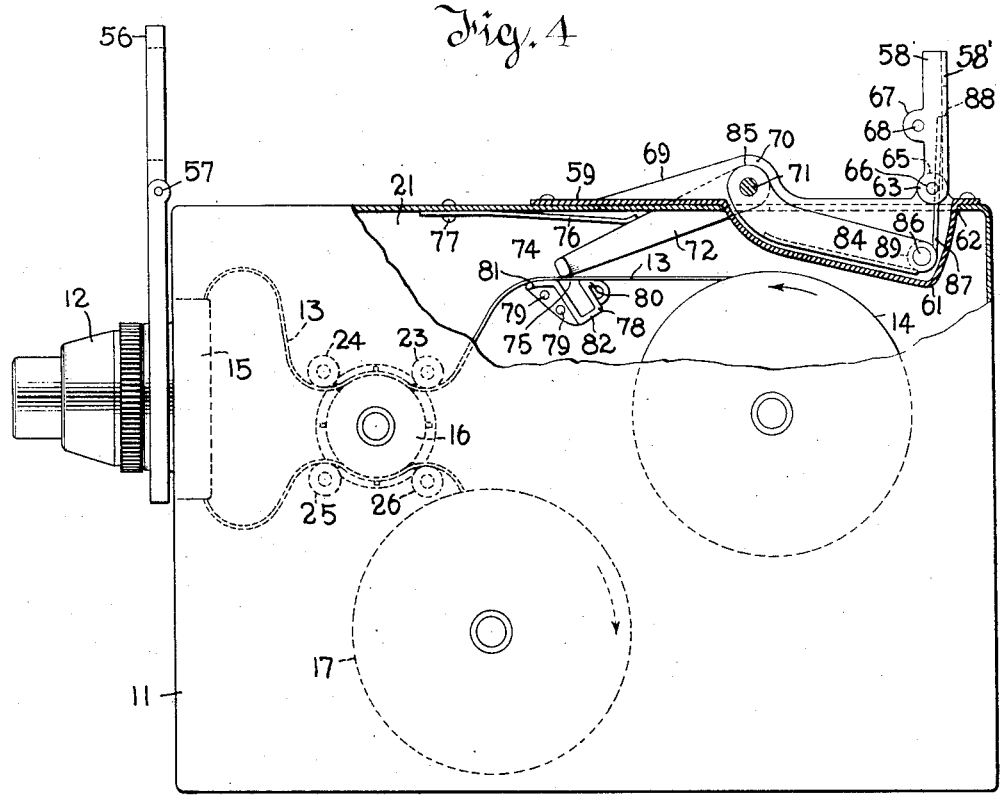
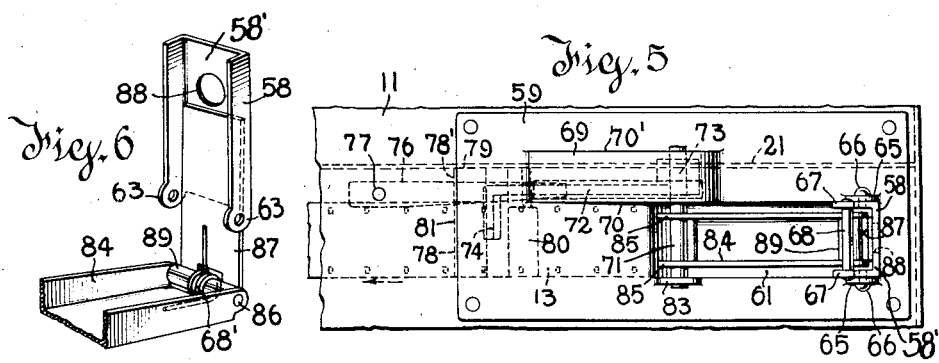
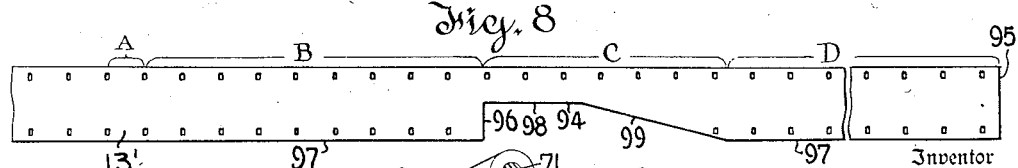
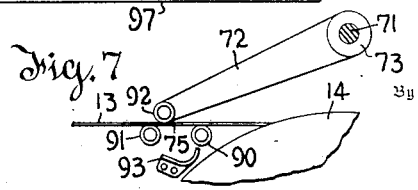
Inventor
Thomas W. Kirkman
By Dodge and Sons
Attorneys Patented Feb. 21, 1939

2,148,076

UNITED STATES PATENT OFFICE 2,148,076

MOTION PICTURE CAMERA

Thomas W. Kirkman, New York, N. Y.

Application October 7, 1936, Serial No. 104,530

7 Claims. (Cl. 88—16)

This invention relates to motion picture cameras.

Most motion picture cameras are provided with footage indicators which show at all times approximately how many feet of unexposed film still remain in the camera. When a motion picture camera is being operated, the photographer continuously views the scene he desires to photograph by sighting through the usual view finder provided on the camera. Hence, while he is operating the camera, the photographer cannot observe the film footage indicator to determine exactly when the film is used up. Therefore, should the unexposed portion of the film become exhausted while the camera is in operation, the operator is not apprised of this fact until the camera is stopped and the footage indicator inspected.

The operator, under these circumstances, is uncertain as to the particular stage of the scene, act or event just photographed at which the film gave out, and cannot determine how much of the desired picture was recorded on the film until it is developed and the picture inspected. Should it prove that less than the desired action has been photographed, disappointment and loss to the photographer result, because oftentimes it is impossible to retake a scene, act or event except on a particular date or at a particular time.

The primary purpose of the present invention is to overcome the above-mentioned difficulties by providing a motion picture camera having simple and effective means for indicating instantly to a photographer operating the camera whenever recording of the picture ceases due to exhaustion of the unexposed portion of the film. Thus, the operator knows definitely that the last view observed at the time the indicatoin or signal was given is the last scene that will appear upon the film when developed. He may then insert a new film in the camera and retake the entire scene, act, or event, if desired, or he may take such photographs as are necessary to complete the desired picture.

Another important object is the provision of means for indicating more accurately than do the usual footage indicators, when the unexposed portion of the film is exhausted.

A further object is the designing of the camera, the film and the indicating means so that, whenever the operator receives an indication that the film is used up during operation of the camera, he will be assured that the last scene observed by him at the time the signal was given, will appear clearly on the film when it is developed. In other words, he will know the exact point up to which the film will provide a proper recording of the action, and hence he can immediately determine whether a complete retake or merely additional photographs are necessary.

The accompanying drawings disclose several practical embodiments of the invention wherein:

Figure 1 represents a side elevation of one form of motion picture camera with a film in place and the camera cover removed to show the film exhaustion indicating means in non-indicating position.

Fig. 2 is a section on line 2—2 of Fig. 1, with the film and the indicator stop omitted.

Fig. 3 is a section on line 3—3 of Fig. 1, with certain parts omitted for sake of clearance and the film shown in dotted lines.

Fig. 4 is a side elevation af another type of motion picture camera to which the invention has been applied, the camera finder being shown in operative position, and the camera casing broken away to reveal the indicator actuating means.

Fig. 5 is a fragmentary plan view of the camera of Fig. 4, with the parts in the same position.

Fig. 6 is a perspective of a modified form of the film exhaustion indicating means of Fig. 4.

Fig. 7 is a modified form of the actuating means for the indicating means of Fig. 4.

Fig. 8 is a plan view of a special type of film which may be used with either the camera of Fig. 1 or that of Fig. 4.

In the form of camera appearing in Figs. 1–3 of the drawings, 11 is the camera casing, 12 the lens assembly, and 13 the film. The film extends from the unexposed film or full reel 14 through the film feeding mechanism, including sprocket wheel 16, past the lens at 15, back to sprocket wheel 16, and thence onto the exposed film or empty reel 17.

Sprocket wheel 16 has a spindle 18, and exposed film reel 17 has a spindle 19, both of which extend through partition 21 of the case into compartment 22 where they are suitably driven by the usual spring motor (not shown). The film and camera parts when in operation move in the directions indicated by the arrows in the several figures to feed the film from reel 14, past the lens, and thence to reel 17. Associated with sprocket 16 is the usual set of four guide rollers 23, 24, 25 and 26 which serve to maintain the teeth 27 of the sprocket wheel in film holes 28 so that the film is fed properly past the lens. Each guide roller is mounted on a stud 29 supported by partition 21.

The view finder for this type of camera extends through the motor compartment 22. The finder is in the form of a tapered tube 31 connecting a peep-hole or lens 32 at the rear of the camera with a lens frame 33 at the front of the camera.

The film exhaustion indicating means will now be described. Mounted for rotation in an opening in partition 21 is a shaft 34. A plate 36 is rigidly secured at 37 to the outer end of shaft 34. A spacer sleeve 38 is provided on shaft 34 between plate 36 and partition 21. The inner end of shaft 34 has an arm 39, fixed thereon, which carries a pin 40 at its outer end. A spacer sleeve 41, having an end flange 42, is mounted on shaft 34 between partition 21 and arm 39. Mounted under tension on sleeve 41 is a light, coil spring 43 having one end bearing against pin 44 on partition 21 and its other end against arm 39, as shown in Fig. 1. Thus spring 43 continuously tends to rotate shaft 34 so as to move plate 36 in the direction indicated by the arrow in Fig. 1.

A horizontal stud 45 on one of the outer corners of plate 36 carries a roller 46. Because of the action of spring 43, roller 46, as shown in Figs. 1 and 3, normally bears with yieldable pressure against that portion of film 13 which extends between guide roller 23 and a similar guide roller 47. This roller also is carried by a stud 29 on partition 21. With this arrangement, it will be clear that roller 46 in no way interferes with feeding of the film during operation of the camera. However, when the unexposed portion of the film on reel 14 becomes exhausted and the end of the film leaves the reel, immediately upon passage of this end of the film from between rollers 23 and 47, plate 36 swings under the urge of spring 43 so that roller 46 passes between rollers 23 and 47. This movement is limited by engagement of roller 46 with stop plate 48, shown in Fig. 1. Plate 48 is secured at 49 to partition 21. A finger piece 50 permits the plate and roller 46 to be swung back out of the way against the resistance of spring 43 sufficiently to permit insertion of a new film.

A small, reciprocatory shutter 51 is located in motor chamber 22 and is pivotally connected at 52 to pin 40 on arm 39. The outer end of shutter 51 projects freely through guide slot 53 in a bracket 54 secured to the wall of the camera. Finder tube 31 is transversely slotted at 55 (Fig. 1), whereby to receive the outer end of shutter 51 so as to cut off the view through the finder. The parts are so proportioned and arranged that, as long as there is unexposed film on reel 14 and, hence, roller 46 and plate 36 remain in the normal, inoperative position of Fig. 1 because of engagement of roller 46 with the film, shutter 52 will not project into slot 55 in the view finder. However, as soon as the unexposed film is exhausted and the passage of the end of the film past roller 46 permits plate 36 and arm 39 to swing under the urge of spring 43, shutter 51 is projected into the view finder tube to interrupt the operator's view therethrough.

It will thus be seen that the means decribed coact directly with the film itself in such a manner that when the end of the film passes a predetermined point, i. e., roller 46, shutter 51 instantly shuts off the view through the camera finder. Thus the photographer, while still operating the camera, is instantly notified that the film has been used up and knows that the last view observed through the finder is the last scene that will appear on the film when developed. Upon insertion of a new film, a complete retake may be made or only such additional action may be photographed as is necessary to complete the picture.

A further advantage resides in the accuracy of the indication furnished by the described means as to when the end of the film is reached, as compared with the approximate indication of film exhaustion furnished by the conventional footage indicators now in use. Most of the latter contact with the outside convolution of the film on the reel and depend upon the thickness of the film on the reel to indicate when the film is exhausted. Obviously, such devices give only a comparatively rough indication as to when the end of the film is reached. The present device on the contrary gives a definite signal which is an accurate indication as to when the film is exhausted, since it is operated instantly by passage of the end of the film itself past a predetermined point between the film reels and in close proximity to the lens.

In inserting a new film, plate 36 and roller 46 are held back by finger piece 50, as explained, thereby causing arm 39 to withdraw shutter 51 from view finder tube 31. A short section of the new film on full reel 14 is now unwound and threaded between rollers 23 and 47 on one side and roller 46 on the other side. Finger piece 50 is then released to permit spring 43 to swing plate 36, and thus press roller 46 against the film and the film in turn against rollers 23 and 47. Threading of the film is then continued in the usual manner around sprocket 16, rollers 24, 25 and 26, and thence to empty reel 17. The camera is now ready for further use, the shutter 51 being retained out of the line of vision of the operator through the view finder until the film in the camera is again exhausted.

The camera of Figs. 4 and 5 has the usual unexposed film reel 14 from which film 13 is fed to the exposed film reel 17, past the lens at 15, by film feeding sprocket wheel 16 and the film receiving wheel. Associated with sprocket wheel 16 are the usual guide rollers 23, 24, 25 and 26. In this type of camera the view finder is located on top of casing 11. The finder comprises a lens holder 56 pivoted at 57 at the front of the camera, and a channel-shaped, peep-hole lens holder 58, having a base portion 58′, pivotally mounted at the rear of the camera. Thus the parts of the finder may be folded down against the camera when not in use.

A plate 59 secured to the top of the casing 11 has a well portion 61 depending through an opening 62 in the casing. Mounted on plate 59 is the film exhaustion indicating means and the peep-hole frame 58. Perforated ears 63, 63 are provided on the lower ends of the sides of frame 58. These ears aline with perforated ears 65, 65 on plate 59 and receive short rivets 66, 66 whereby frame 58 is pivotally mounted in place. Frame 58 also has a pair of perforated ears 67, 67 carrying a cross pin 68 for a purpose explained later.

Plate 59 has an upstanding hollow portion 69 opening at its underside into the interior of the camera. Rotatably mounted in openings in walls 70, 70′ of hollow portion 69 is a cross shaft 71. A crank 72 rigidly secured to this shaft at 73 extends downwardly into the camera. A finger 74 on the lower end of crank 72 normally rests on the film at 75, being continuously urged downwardly by a light, leaf spring 76 secured to the casing at 77 and bearing at its free end against the upper edge of crank 72.

Projecting beneath film 13 at 75 is a channel-shaped guide member 78 having an extension 78′ by which it is secured at 79 to partition 21. Edge portions 80 and 81 of member 78 form spaced guiding elements for the film between which finger 74 on crank 72 may drop freely the instant the end of the film on reel 14 passes beneath finger 74. Bottom wall 82 of member 78 acts as a stop to limit downward movement of finger 74 and crank 72. When finger 72 drops, shaft 71 is rotated in a counterclockwise direction (Fig. 4) by crank 72.

The outer end of shaft 71 is rotatably supported in perforated ear 83 on plate 59. Located in well 61 is a channel-shaped crank 84. Shaft 71 extends through and is keyed to perforated ears 85, 85 on one end of crank 84, thus forming a bell crank in conjunction with crank 72. A cross pin 86 mounted in the sides of crank 84 at its outer end forms a pivotal connection with the lower, tubular end 89 of a small shutter 87. The upper end of this shutter extends freely between the sides of peep-hole frame 58 with its upper edge normally located just below peep-hole 88 so as not to project into the line of vision through the view finder. Pin 68 insures retention of shutter 87 in operative position.

With the parts in the operative position of Fig. 4, the camera may be run in the usual manner with the photographer sighting through the view finder. As soon as the end of the film is reached, finger 74 drops into guide member 78 under the action of spring 76, and through the action of the parts described, shutter 87 is elevated to cut off the view through the finder. Thus, as with the construction of Figs. 1 to 3, the operator receives an accurate indication of the last scene photographed at the time the film ran out. In inserting a new film, crank 84 is depressed, thereby lowering shutter 87 below peep-hole 88 and raising finger 74. This permits threading of the film into place, as already described. Crank 84 is then released and the parts assume the normal position of Fig. 4, with finger 74 resting on the film at 75 and the camera ready for continued use.

It is important to note that with the construction described the film exhaustion indicating means proper are located outside of the camera and the actuating means therefor are inside of the camera, but that no openings are present through which light might penetrate, and thereby damage the film. When the camera is not in use, view finder frame 58 may be folded down, as may also peep-hole frame 58, without interference with the film exhaustion indicating mechanism. This is permitted by the free sliding arrangement of shutter 87 in finder frame 58 and its pivotal connection 86 to crank 84. As finder frame 58 is folded down its base portion 58' acts on shutter 87 to swing it downwardly towards crank 84. Retaining pin 68 is arranged to permit this movement, but also is in position to swing shutter 87 upwardly when frame 58 is moved to the position of Fig. 4.

In the modified arrangement of Fig. 6, the functions of retaining pin 68 of Fig. 4 are performed by a light, coil spring 68' mounted on the tubular end 89 of shutter 87. One end of the spring bears against the shutter and the other end against crank 84 so as to yieldably maintain the shutter in the position shown. This permits the necessary up and down movement of the shutter in frame 58 to cover and uncover peep-hole 88. It also permits the necessary pivotal movement when frame 58 is folded down.

The spring automatically restores the shutter to the position of Fig. 6 when frame 58 is raised.

In the modification of Fig. 7, the arrangement is similar to that of Fig. 4, but guide member 78 is replaced by a pair of spaced film guide rollers 90 and 91, and a roller 92 replaces finger 74 on crank 72. A plate 93, similar to plate 48 of Fig. 1, serves as a stop for roller 92.

Fig. 8 illustrates a modified form of film 13' which may be used with any of the film exhaustion indicating arrangements shown in the drawings in order definitely to assure the operator that the last scene observed through the view finder at the instant the view finder shutter closed, will be clearly recorded on the film when developed.

This film is provided with a special inner end portion adapted to actuate the indicator shutter in the view finder a slight interval before the inner extremity of the film reaches the indicator actuating means. Film 13' is the same as standard film 13, except for a notch 94 near the extremity 95 of the unexposed portion of the film on reel 14. Notch 94 extends at 96 at right angles to edge 97 of the film, then along the middle of the film at 98, and then inclines at 99 to film edge 97. Use of this special end film 13' will be described only in connection with the indicator mechanism of Figs. 1 to 3, since its mode of operation with the several forms of indicator mechanism shown is the same.

With the camera in operation, the instant edge 96 of film notch 94 passes roller 46, the roller is free to swing under the influence of spring 43. Consequently film exhaustion indicator shutter 52 is operated, as already described with reference to the standard film, to notify the operator of the exact last frame filmed. Continued operation of the camera feeds the remainder of the film therethrough and onto reel 17.

Portion B of film 13' is the length of film which extends from roller 46 (Fig. 1) to point 15 behind the lens at the instant shutter 52 is actuated. Hence, portion A of the film will contain the last frame or scene filmed at the instant shutter 52 is closed. End portions B, C and D of the film are of sufficient length to encircle the main exposed portion of the film on reel 17 a number of times, and thus protect the main portion of the film from being light struck when reel 17 is removed from the camera. This assures the operator that a perfect recording of the picture, up to and including the last frame at point A, will appear on the film when developed.

Application of the invention to other types of motion picture cameras, and also various changes in and modifications of the particular mechanism employed, are contemplated as within the scope of this invention, except as the same may be limited by the appended claims.

What is claimed is:

1. In a motion picture camera, the combination of an unexposed film holder; an exposed film holder to which a film is adapted to be fed from the unexposed film holder; a view finder; a shutter movable into and out of an operative, signaling position in which it obstructs, at least in part, the view through said finder to indicate exhaustion of the film, restrainable means constantly urging said shutter towards said signaling position; and film controllable means for engaging the film between said film holders to restrain said urging means to maintain the shutter out of signaling position.

2. In a motion picture camera, a lens; a film supply reel; a film on said reel having a section thereof extending from the reel to the focal plane of the lens; means for feeding the film past the lens from the supply reel; a view finder; means, including a shutter, adapted for operation to cut off the view through the finder to indicate exhaustion of the film; and actuating means, extending between the indicating means and said film section, including a shaft, an arm on the shaft pivotally connected at its outer end to said shutter, a second arm on the shaft having a finger bearing on said film section, and a spring urging said finger against the film and said indicating means towards operative position, whereby the indicating means are adapted to be operated by the spring upon movement of the film out of engagement with said finger.

3. The combination in a motion picture camera having a casing, a lens and means for feeding a film past the lens, of a view finder; means to foldably mount the view finder on the exterior of the casing; movable means in the finder for indicating when the film is exhausted; and means on the finder engageable with the indicating means to fold the indicating means with the finder.

4. The combination in a motion picture camera having a casing, a lens and means for feeding a film past the lens, of a view finder; means to foldably mount the view finder on the exterior of the casing; movable means in the finder for indicating when the film is exhausted; means on the finder engageable with the indicating means to fold the indicating means with the finder; and means for repositioning said indicating means ready for operation upon movement of the finder from folded to operating position.

5. In a motion picture camera, the combination of an unexposed film holder; an exposed film holder to which a film is adapted to be fed from the unexposed film holder; a view finder; a shutter movable into and out of an operative, signaling position in which it obstructs, at least in part, the view through said finder to indicate exhaustion of the film, restrainable means constantly urging said shutter towards said signaling position; a film operatively arranged in the camera on the film holders, said film having a notch in one edge thereof spaced a distance from the inner extremity of the film sufficient to provide a suitable length of film between the notch and said end of the film to be wound on the film on the exposed film holder for protective purposes; and film controllable means including a member engaging the film between said film holders to normally restrain said urging means to maintain the shutter out of signaling position, said film engaging member and said film notch being alined with each other lengthwise of the film to permit passage of said member through the notch upon its arrival opposite said member, whereby said urging means may move the shutter into signaling position.

6. The combination set forth in claim 1 further characterized in that said restrainable means includes spring means constantly urging the shutter towards signaling position, and that the film controllable means comprises a member constantly urged by said spring means in a direction for engaging the film between said film holders.

7. The combination as set forth in claim 1 further characterized in that said restrainable means includes spring means constantly urging the shutter towards signaling position; that the film controllable means comprises a member constantly urged by said spring means in a direction for engaging one side of the film between said film holders; and that a pair of spaced film guiding elements is provided for engaging the opposite side of the film at either side of said film engaging member, whereby, upon movement of the film from between the film engaging member and the guiding elements, said film engaging member will pass between the guiding elements and thus permit said urging means to move the shutter to signaling position.

THOMAS W. KIRKMAN.